(12) United States Patent
Statt

(10) Patent No.: US 6,819,451 B1
(45) Date of Patent: Nov. 16, 2004

(54) CALIBRATION OF COLOR REPRODUCTION APPARATUS FOR SIMILAR RECEIVERS FROM DIFFERENT COATING EVENTS

(75) Inventor: David J. Statt, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/521,329

(22) Filed: Mar. 9, 2000

(51) Int. Cl.$^7$ .......................... G09G 5/00; G01D 18/00
(52) U.S. Cl. .......................... 358/1.9; 345/178; 702/85
(58) Field of Search .......................... 358/1.9, 3.1, 2.1, 358/530, 406, 504, 505; 382/112, 162, 224; 493/37; 428/170; 345/178; 702/85

(56) References Cited

U.S. PATENT DOCUMENTS 5,053,866 A    10/1991  Johnson
5,491,568 A    2/1996   Wan
6,618,158 B1 * 9/2003   Brown et al. .............. 358/1.13

* cited by examiner

Primary Examiner—Mark Wallerson
Assistant Examiner—Thomas J Lett
(74) Attorney, Agent, or Firm—Milton S. Sales; David A. Novais

(57) ABSTRACT

Reproduction apparatus is periodically calibrated using only one member of a group of receivers. A correction is applied for other members of the group based on their relative differences from the one member. The one member to be calibrated periodically is designated the "key" member. Whenever a new member of the group comes into the lab, it, along with the key member are calibrated. The ratios of the density outputs over the full exposure range are calculated and saved for the new member. Then, at each reproduction apparatus calibration, the density outputs for the key member are determined and the ratios of density outputs are applied to predict the corresponding density outputs of the other group members, as if they were being calibrated at the same time.

5 Claims, 4 Drawing Sheets

CALIBRATION OF COLOR REPRODUCTION APPARATUS FOR SIMILAR RECEIVERS FROM DIFFERENT COATING EVENTS

FIELD OF THE INVENTION

This invention relates to color calibration for digital color reproduction apparatus such as, for example a color fax or printer.

BACKGROUND OF THE INVENTION

Color reproduction apparatus renders an image from color signals representing a color image description. The input to such a color reproduction apparatus is an array of color signals (sets of input code values) communicating the desired colors of a corresponding array of picture elements in the image to be rendered.

The reproduction apparatus causes cyan, magenta and yellow, and sometimes black, dyes to be laid down on a receiving medium in response to color signals (its inherent drive code values) applied to its dye marking or producing devices.

A goal is to make the renderings match an original intent as nearly as possible. In order to do so, a transform is employed which maps the received input code values, normally in RGB space, to the reproduction apparatus' inherent drive code values, so that the system faithfully reproduces the color image original. Often the transform is implemented by employing a set of three or four one-dimensional calibration lookup tables. The process of deriving such a transform is called system color calibration.

Such apparatus requires re-calibration from time to time due to changes in the apparatus' behavior, as might be affected by the state of processor chemicals if any are used, color marking system drifts, and changes in receiver characteristics. Differences in receiver characteristics might be caused by different recipes, variations in receivers from one coating event to another, and different surface finishes (i.e., glossy verses matte finishes) as are commonly encountered using photographic receivers.

Photographic papers are sold by manufacturer and type. For example Eastman Kodak Company sells among others, Edge 7™ optical printing paper and Type 2976™ digital paper Eastman Kodak Company and the other paper manufacturers coat their papers in batches called "coating events." For each coating event, fresh emulsions are mixed and tested for conformance to aim characteristics. Notwithstanding all efforts to make each batch identical, there will be some very small batch-to-batch variability from the aim characteristics for that paper type. When paper is packaged for sale, it is labeled by manufacturer and type with identifiers which indicate the coating event from which that particular paper was cut.

Generally, a lab will purchase large quantities of paper at one time to ensure that its stock came from a single coating event. However, in many instances, papers of the same type, but from different coating events will be in use at the same time. Papers or other receivers which are of a certain type but which may come from different coating events are referred to herein as members of a group.

Calibration of a printer typically accounts for every parameter that can cause density variations of a print. This includes writing system, receiver, chemistry etc. Accordingly, different receiver types must be separately calibrated. However, if the variations between members of a group are small, then a lab may be satisfied calibrating on only one member of that group, regardless of coating event. For best results, however, each instance of a coating event should be calibrated separately every day.

DISCLOSURE OF THE INVENTION

It is an object of the present invention to provide a system to periodically calibrate only one member of a group of receivers of a certain type (say, each day) and to apply a correction for other members of the group based on their relative differences from the one member. The one member to be calibrated periodically is designated the "key" member. Whenever a new member of the group comes into the lab, it, along with the key member is calibrated at more or less the same time. The ratios of the density outputs over the full exposure range are calculated and saved in what is herein called a "delta file" for the new member. Then, at each reproduction apparatus calibration, the density outputs for the key member are determined and the ratios from the delta files are applied to predict the corresponding density outputs of the other group members, as if they were being calibrated at the same time. By this process, only one calibration (the calibration of the key member) is done on each group and each reproduction apparatus. If more than one group is being used, then a separate calibration is effected for the key member of each group.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Calibration of a color reproduction apparatus begins by specifying color aim curves. A color aim curves are a set of three or four separate curves, one for each of the red, green, blue and possibly black channels and each specifies the desired density output as a function of the corresponding input code value. It is intended that the three (or four) separate curves are to be used in concert and is designed to sample the entire density range. It is commonplace that when the input code values for red, green, and blue channels are equal, that a visually neutral gray is to be rendered. The color aim curve defines both the definition of neutral in terms of the relationship between measured densities and the relation between (common) input code values and output densities. The entries of the table define a relationship of density as a function of input code value, or:

$$Density = f(iCV)$$

It is further commonplace to develop three such functions for a 3-color printer, one for each color. Thus, the family of functions can be expressed as:

$$Density_{Red} = f_{red}(iCV_r),$$

$$Density_{Green} = f_{green}(iCV_g), \text{ and}$$

$$Density_{Blue} = f_{blue}(iCV_b).$$

These equations are used to find the values that should produce the correct drive code values for each entry in the three calibration lookup tables.

Figure 1:
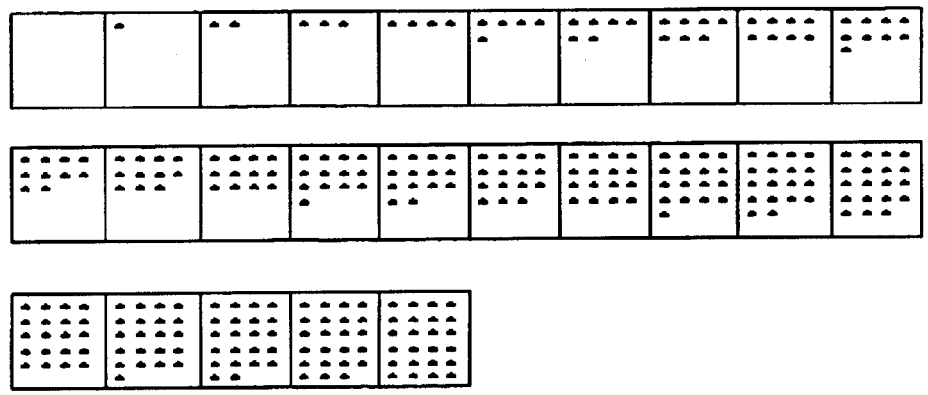
FIG. 1 is a schematic diagram showing a near-neutral test pattern employed in the prior art.

Often, aim curves are linear. A truly neutral density (gray) calibration target (FIG. 1) contains a series of aim neutral (gray) density patches, which are encoded as grays ranging from white to black. The input code values in the target's description are passed through existing calibration lookup tables to remap them into drive code values that the reproduction apparatus will actually use to make a print. If the reproduction apparatus is in calibration, the resultant print will have the correct aim densities. The calibration lookup table is really three separate lookup tables (or channels) in a 3-color reproduction apparatus: one lookup table for each color, red, green, and blue; or four lookup tables or channels for a 4-color reproduction apparatus (black and the other three colors). Mathematical transforms may be employed in lieu of lookup tables. The resulting. densities of the rendered patches are measured using an optical instrument such as a densitometer; and compared to the aim densities. If any of the patch density values are different than aim, being either too light or dark, or possess a non-neutral hue, then new sets of calibration lookup table values or transforms are derived using a mathematical method such as regression so as to increase or decrease the density of the corresponding color.

Figure 2:
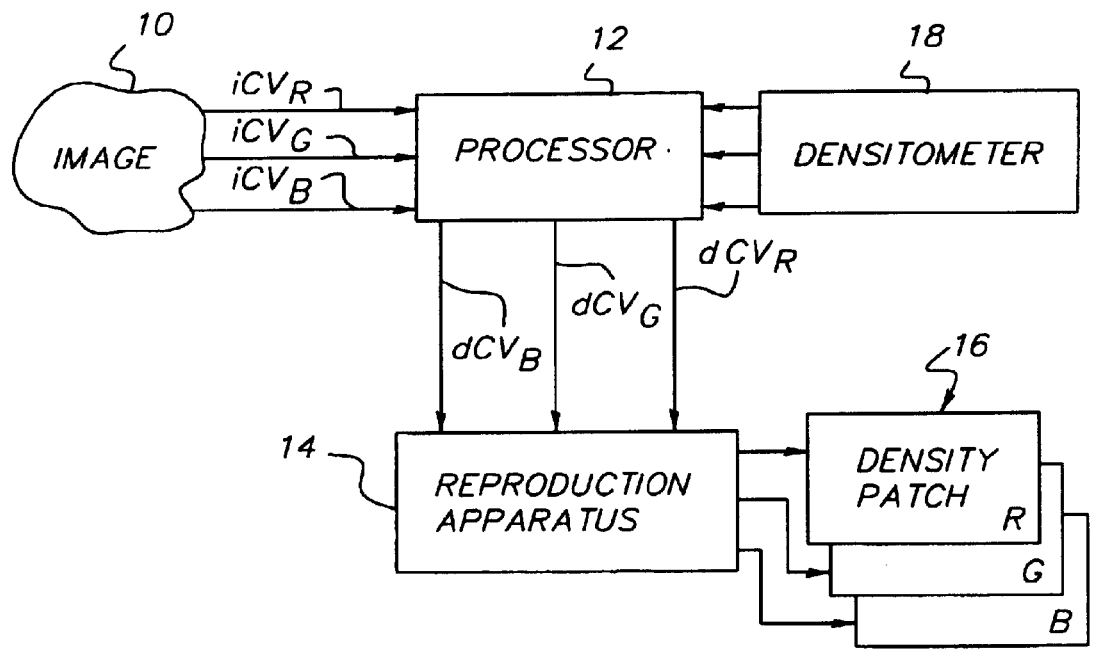
FIG. 2 is a schematic diagram illustrating a color reproduction system according to the present invention.

Referring to FIG. 2, a color image, represented in digital form as a plurality of image input code values $iCV_R$, $iCV_G$, $iCV_B$, corresponding respectively to desired densities $D_R$, $D_G$, and $D_B$, is inputted by a digital image processor 12. The image processor contains three separate calibration lookup tables (or channels) in a 3-color reproduction apparatus (one lookup table for each color red, green and blue) for converting received digital input code values $iCV_R$, $iCV_G$, $iCV_B$ into uniquely-associated drive code values $dCV_R$, $dCV_G$, and $dCV_B$, respectively, for a reproduction apparatus 14. The image processor may contain four lookup tables or channels for a 4-color reproduction apparatus (black and the other three colors). Mathematical transforms may be employed in lieu of lookup tables. Reproduction apparatus 14 uses the code values to produce color separations for the final rendering.

Figure 3:
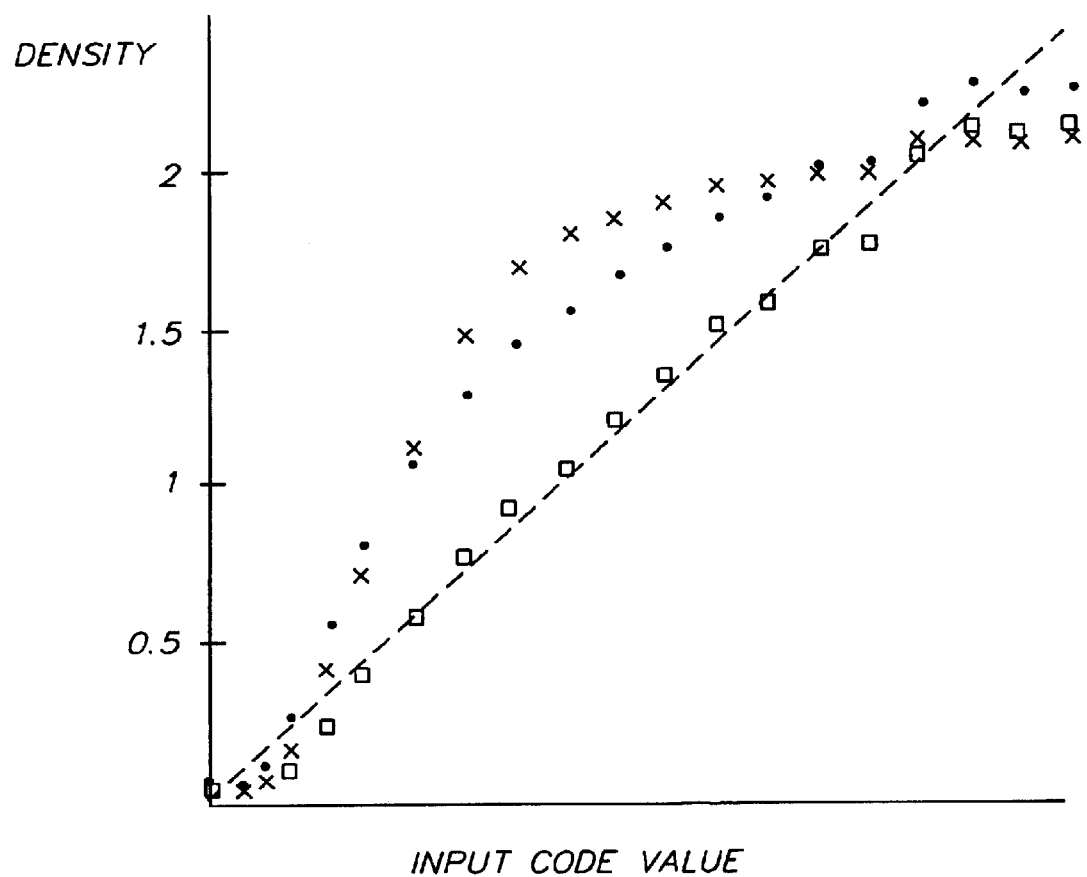
FIG. 3 is a plot of measured density data from a target verses input code value plotted with the desired behavior.

Calibration of the color reproduction apparatus begins by specifying one or more aim curves of the desired density output as a function of input code values for the entire density range. In FIG. 3, the diagonal line represents the desired behavior of the system for one possible aim curve description whereby input code values are linearly related to desired output densities. A calibration target containing a series of aim color density patches is digitized into a series of input code value signals and passed through image processor 12 to remap the image's input code value signals into drive code values used by reproduction apparatus 14 to make a rendering. The resulting densities of the rendered patches are measured using an optical instrument such as a densitometer 18; and compared to the intended color densities. In FIG. 3, the data points are the actual measured densities from the target plotted against the target input code values. If, as in FIG. 3, any of the patch density values are different than intended, being either too light or dark, or possess a non-neutral hue, then, using a mathematical method such as regression, new sets of lookup table values or transforms are derived so as to increase or decrease the density of the corresponding color.

Figure 4A:
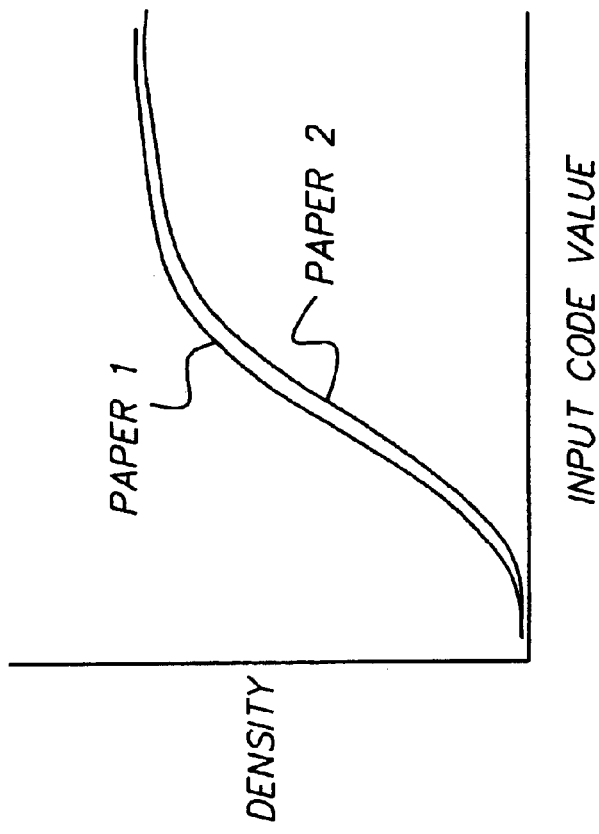
FIGS. 4A and 4B are characteristic curves showing the effect that different chemistries might have on photographic papers of the same type manufactured during different coating events.
Figure 4B:
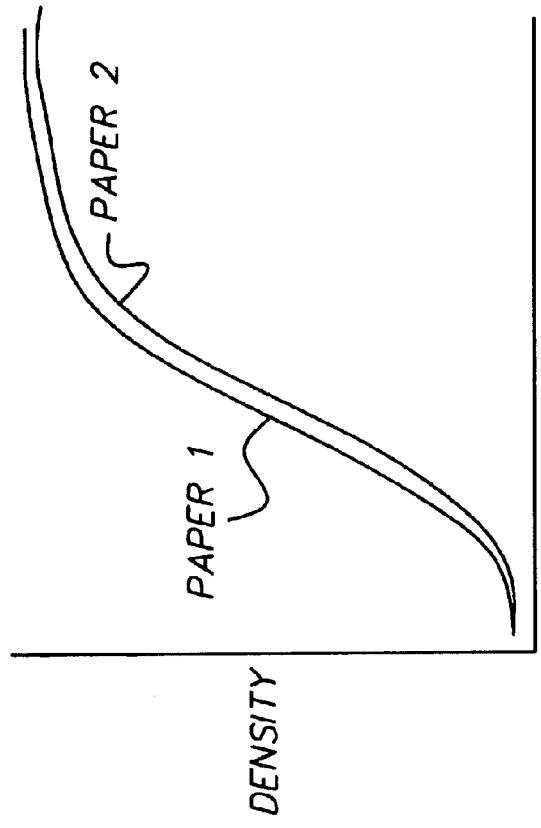

Comparing the characteristic curves of FIGS. 4A and 4B, one sees the effect that different processor chemistries might have on, say, photographic papers of the same type manufactured during different coating events (i.e., Group Members). FIG. 4A shows the response of two papers of the same Group, labeled "Paper 1" and "Paper 2" processed using a particular chemistry. Paper 1 and Paper 2, although being the same type, were manufactured during different coating events. Therefore, their characteristic curves are similar but not necessarily identical, as illustrated in FIG. 4A. FIG. 4B shows the response of the same Paper 1 and Paper 2 processed by a different chemistry. One will recall that processing chemistries will likely change as the chemistry ages and/or is contaminated. Note that there is a major difference between the characteristic curve of Paper 1 processed by Chemical "A" and the characteristic curve of the same Paper 1 processed by Chemical "B". The same is true for Paper 2 as the chemistry changes. While the characteristic curves for both papers will change, they will change in a very similar manner. Therefore, the ratio of characteristic curves of papers of the same Group are more or less preserved even when the chemistry is changed. That is, the difference between the characteristic curves of Paper 1 and Paper 2 when both are processed by Chemical "A" is substantially the same as the difference between the characteristic curves of Paper 1 and Paper 2 when both are processed by Chemical "B." The present invention makes use of this phenomenon to provide a new approach for calibrating color reproduction apparatus as chemistries change.

Figure 5:
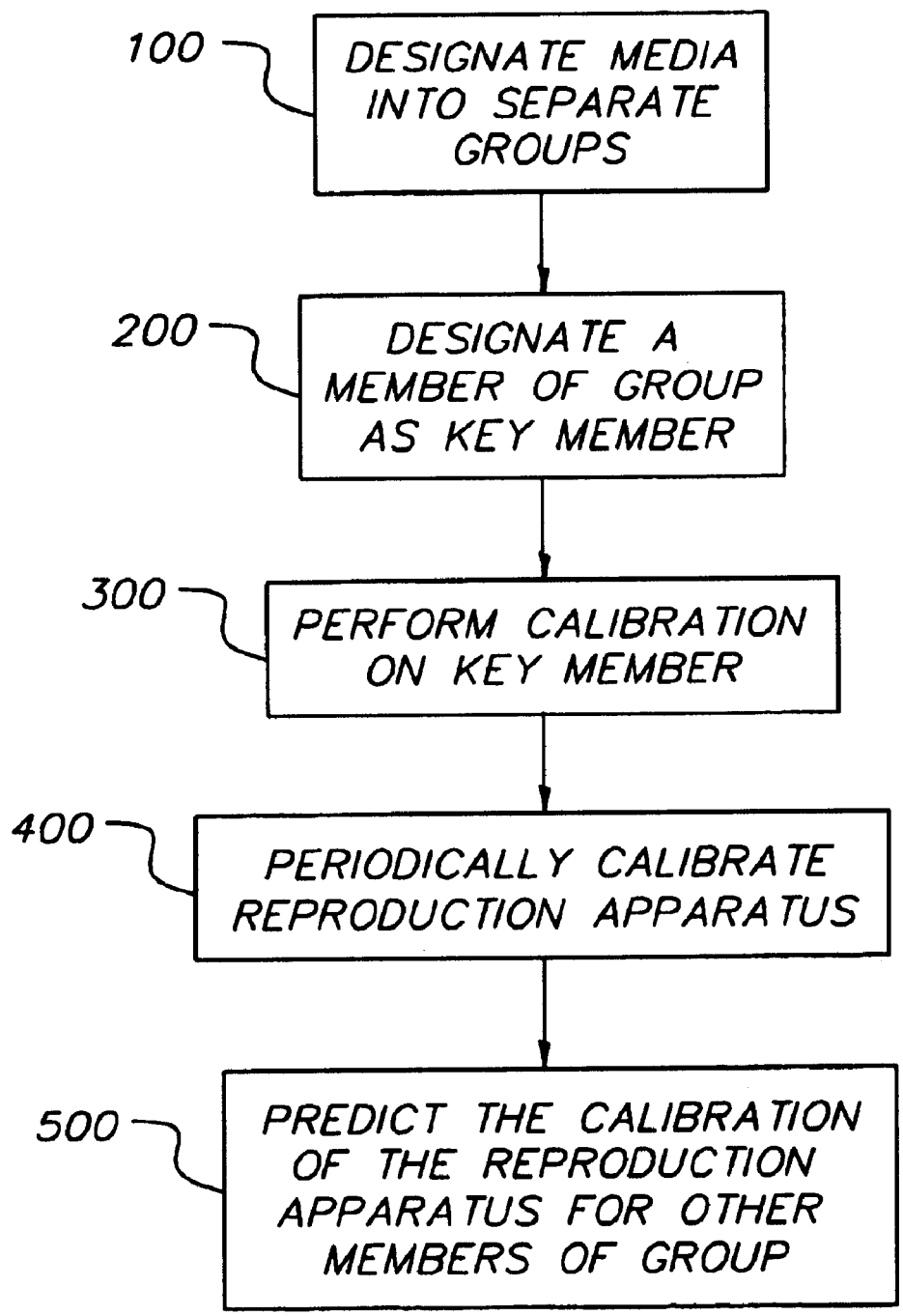
FIG. 5 is a flow chart illustrating a method in accordance with the present invention.

With reference to the flow chart of FIG. 5, according to the present invention, a system is provided to periodically (say, each day) calibrate only one member of a group of receivers of a certain type and to apply a correction for other members of the group based on their relative differences from the one member. That is media is designated into separate groups based on characteristics of the media such that media in each group have similar characteristics (step 100). The one member to be calibrated periodically is designated the "key" member (step 200). Whenever a new member of the group comes into the lab, it, along with the key member are calibrated at more or less the same time (step 300) and the reproduction apparatus is periodically calibrated (step 400). The ratios of the density outputs over the full exposure range are calculated and saved in what is herein called a "delta file" for the new member. Then, at each reproduction apparatus calibration, the density outputs for the key member are determined and the ratios from the delta files are applied to predict the corresponding density outputs of the other group members (step 500), as if they were being calibrated at the same time. Alternatively, the characteristic curves (the function D=F(dCV)) are determined for the key member and other member, and the ratio of those are taken. By either process, only one calibration (the calibration of the key member) is done on each group and each reproduction apparatus. If more than one group is being used, then a separate calibration is effected for the key member of each group.

When a lab receives a shipment of receiver, an operator should write an identifier of the receiver on the package. Also when a receiver is put into a cassette, the receiver's identifier should be put onto a label on the cassette. While it is intended that each unique identifier correspond to a unique coating event, that is not necessary. A lab may find it tedious to track identifiers by coating event. A much easier technique is to assign new identifiers to each size of receiver in each new shipment, as generally, in a shipment, all receiver of a given size will come from the same coating event. Since orders are placed infrequently, it is unlikely that the receivers in a new batch will be from the same coating event as receivers delivered earlier, so that assigning a new identifier is fine. Even if receivers are coincidentally from the same batch, there is no problem with treating them as members of different coating events, other than the time expended calibrating each member.

The invention has been described in detail with particular reference to preferred embodiments thereof, but it will be understood that variations and modifications can be effected within the spirit and scope of the invention.

What is claimed is:

1. A method of calibrating a color reproduction apparatus which uses media of different types, the method comprising the steps of:

designating media into separate groups based on characteristics of the media such that media in each group have similar characteristics;

designating a member of each group as a key member;

performing a calibration on said key member to determine a ratio of density outputs over an exposure range of said key member to density outputs over the exposure range of said other members of the group;

periodically calibrating the reproduction apparatus using the density outputs of the key member; and using said ratio of density outputs to predict the calibration of the reproduction apparatus for the other members of the group.

2. A method according to claim 1, wherein said media is one of photographic paper.

3. A method according to claim 1, wherein said media is one of photographic film.

4. A method according to claim 1 whereby the relationship between the characteristics of the key member and other member papers' behaviors is any arbitrary predictive relationship whether functional or prescriptive that predicts the behavior of a member paper based on the measured behavior of the key paper.

5. A method of calibrating a color reproduction apparatus which uses media of different types, the method comprising the steps of:

designating media into separate groups based on characteristic curves of the media such that media in each group have similar characteristic curves;

designating a member of each group as a key member;

performing a calibration on said key member to determine a ratio of characteristic curves over an exposure range of said key member to characteristic curves over the exposure range of said other members of the group;

periodically calibrating the reproduction apparatus using the characteristic curves of the key member; and using said ratio of characteristic curves to predict the calibration of the reproduction apparatus for the other members of the group.

* * * * *